(12) United States Patent
Skirke et al.

(10) Patent No.: US 10,240,992 B2
(45) Date of Patent: Mar. 26, 2019

(54) SYSTEM AND METHOD FOR TAKING A MEASUREMENT AT A CONNECTION ELEMENT

(71) Applicant: Airbus Operations GmbH, Hamburg (DE)

(72) Inventors: Joern Skirke, Hamburg (DE); Stefan Koester, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 185 days.

(21) Appl. No.: 15/215,144

(22) Filed: Jul. 20, 2016

(65) Prior Publication Data

US 2017/0023422 A1    Jan. 26, 2017

(30) Foreign Application Priority Data

Jul. 21, 2015    (DE) .................. 10 2015 111 827

(51) Int. Cl.
*G01L 5/00* (2006.01)
*G01L 1/25* (2006.01)
*G01H 17/00* (2006.01)
*G01H 11/00* (2006.01)

(52) U.S. Cl.
CPC .......... *G01L 5/0009* (2013.01); *G01L 1/255* (2013.01); *G01H 11/00* (2013.01); *G01H 17/00* (2013.01)

(58) Field of Classification Search
CPC .......... G01H 1/00; G01H 1/12; G01H 9/008; G01H 11/00; G01H 17/00; G01L 1/255; G01L 5/0009
USPC ................ 73/1.82, 761, 767, 768, 778, 855, 73/862.381, 862.59
See application file for complete search history.

(56) References Cited

U.S. PATENT DOCUMENTS

| 5,029,480 | A | * | 7/1991 | Kibblewhite | ........... G01L 5/246 73/761 |
| 5,237,516 | A | | 8/1993 | Heyman | |
| 5,343,785 | A | * | 9/1994 | Holt | ...................... B23P 19/066 73/761 |
| 2011/0088473 | A1 | | 4/2011 | Nelson et al. | |
| 2012/0191378 | A1 | | 7/2012 | Chu et al. | |

(Continued)

FOREIGN PATENT DOCUMENTS

DE    102012202242    8/2013

OTHER PUBLICATIONS

German Search Report, dated Mar. 16, 2016, priority document.

*Primary Examiner* — Benjamin R Schmitt
(74) *Attorney, Agent, or Firm* — Greer, Burns & Crain Ltd.

(57) ABSTRACT

A system for taking a measurement at a connection element. The system has a force sensor having a first side and a second side. The force sensor is configured to provide a measured value representative for a force acting between the first and the second side of the force sensor. The system also has an ultrasonic sensor and a positioning bushing The positioning bushing has a positioning bushing recess, which is configured to receive the ultrasonic sensor, at least in part. The system also has a separate sensor bushing, mechanically coupled to the first side of the force sensor, and having a sensor bushing recess. The sensor bushing recess is configured to receive, at least in part, the positioning bushing and the first end of the connection element. A second end of the connection element can be mechanically coupled to the second side of the force sensor.

6 Claims, 1 Drawing Sheet

(56) References Cited

U.S. PATENT DOCUMENTS

2013/0205576 A1    8/2013  Bense et al.
2017/0023529 A1*  1/2017  Skirke .................... G01N 29/07

* cited by examiner

SYSTEM AND METHOD FOR TAKING A MEASUREMENT AT A CONNECTION ELEMENT

CROSS-REFERENCES TO RELATED APPLICATIONS

This application claims the benefit of the German patent application No. 102015111827.0 filed on Jul. 21, 2015, the entire disclosures of which are incorporated herein by way of reference.

FIELD OF THE INVENTION

The invention relates to a system and a method for taking a measurement at a connection element.

BACKGROUND OF THE INVENTION

Structural components of an aircraft, in particular shell-like structural components, are nowadays connected to one another by connection elements, such as rivets. By way of example, shell-like segments of the aircraft outer skin are connected to one another by a multiplicity of rivets, which are exposed to high loads during the operation of the aircraft. These loads are often not only of a mechanical nature, but are also of a thermal nature, and are produced by the occurrence of high temperature differences between ground operation and flight operation of the aircraft. The rivet connections are checked at certain intervals, accordingly.

DE 10 2010 013 515 B4 describes a drilling and riveting device and also a riveting method for connecting two or more components in aircraft manufacturing structural assembly.

DE 10 2012 202 242 A1 describes a method for joining molded parts by means of a punch rivet, wherein, in one step, a punched hole is radially widened in one section.

SUMMARY OF THE INVENTION

An object of the invention is to enable a reliable and most accurate possible measurement and examination of connection elements.

The invention is characterized in accordance with a first aspect by a system for taking a measurement at a connection element. The system has a force sensor having a first side and a second side. The force sensor is designed to provide a measured value representative for a force acting between the first and the second side of the force sensor. The system also has an ultrasonic sensor and a positioning bushing The positioning bushing comprises a positioning bushing recess, which is designed to receive the ultrasonic sensor at least in part. The system also has a separate sensor bushing, which is mechanically coupled to the first side of the force sensor. The sensor bushing has a sensor bushing recess, which is designed to receive, at least in part, the positioning bushing with the ultrasonic sensor and a first end of the connection element. A second end of the connection element can be mechanically coupled to the second side of the force sensor.

As a result of this system, a substantially ideal orientation of the ultrasonic sensor in the force sensor relative to the connection element to be measured can be achieved. The positioning bushing recess and the sensor bushing recess are oriented here relative to one another in such a way that the ultrasonic sensor is arranged as optimally as possible relative to the connection element for the measurement of the connection element. A specified ultrasonic signal is preferably fed into the connection element by means of the ultrasonic sensor and is reflected at an end of the connection element opposite the feed. The ultrasonic transducer is preferably designed to also detect the reflected ultrasonic signal. The reflecting end of the connection element can be flat or can have one or more irregularities. The irregularities can be formed, for example, as one or more recesses at the reflecting end. The orientation of the ultrasonic sensor by means of its arrangement in the positioning bushing recess relative to the sensor bushing recess is then specified in such a way that an ultrasonic signal contacts a region at the reflecting end of the connection element enabling a sufficient reflection of the signal. In other words, the arrangement of the positioning bushing recess relative to the sensor bushing recess corresponds to a region at the reflecting end enabling a sufficient reflection of the ultrasonic signal. By way of example, the positioning bushing recess and sensor bushing recess are oriented relative to one another in such a way that the ultrasonic sensor is in contact centrally with the first end of the connection element.

The connection element can be formed, for example, as a rivet or screw rivet. The connection element can, alternatively, also be formed as a screw connection or as a retaining ring bolt (lockbolt). Connection elements that can be measured are preferably those that, in the installed state, are acted on by a preload. Here, a rivet, screw rivet and retaining ring bolt represent different types of connection elements. In other words, different types of connection elements differ from one another by different clamping or fastening types.

In the measurement state, the connection element is mechanically coupled to the first side of the force sensor by means of the sensor bushing, such that, in this state, the connection element is arranged between the first side and the second side of the force sensor. If the connection element is fastened with different fastening degrees, a force corresponding to the fastening degree can be ascertained by means of the force sensor, the fastening degree also representing a preload of the connection element. Alternatively, identical embodiments of the same connection element type can also be fastened with different fastening degrees and measured. Identical embodiments of the same connection element type therefore have substantially identical clamping lengths and identical material. Different embodiments of the same connection element type differ from one another by way of example by different clamping lengths and/or different materials of the connection element.

A propagation time of the ultrasonic signal in the connection element to be measured can preferably be ascertained by means of an evaluation unit, which is electrically coupled to the ultrasonic sensor. Depending on this, a length of the connection element can be ascertained. If a number of measurements are taken in succession at one or more connection elements of identical embodiment and identical connection element type by means of the system at different fastening degrees, a conversion factor can be ascertained for this embodiment of the connection element type. The conversion factor then enables a conversion of the measured propagation time into the length and/or preload of the connection element. If different embodiments of different connection element types are measured in this way, a corresponding conversion factor can be ascertained for each embodiment of the connection element type.

The positioning bushing is produced for example from a plastic. Alternatively, or additionally, the positioning bushing can also comprise metal. Here, the positioning bushing recess is formed in such a way that it has a diameter substantially identical to that of the ultrasonic sensor and can thus receive the ultrasonic sensor exactly. Here, the ultrasonic sensor is arranged axially in the positioning bushing in such a way that the sensor head of the ultrasonic sensor is in contact with a specified region at the first end of the connection element. The sensor head is typically also in contact with the specified region at the first end of the connection element by means of a coupling medium, for example a gel material, oil or water, in order to enable a reliable feed of the specified ultrasonic signal and/or in order to reliably detect the reflected signal component thereof In an advantageous embodiment of the first aspect, an outer diameter of the positioning bushing in the region of a sensor head of the ultrasonic sensor is substantially identical to an inner diameter of the sensor bushing recess. This has the advantage that the positioning bushing and the sensor bushing are oriented relative to one another in such a way that the sensor head of the ultrasonic sensor is in contact with the connection element in the specified region at the first end of the connection element, in order to enable a reliable measurement of the connection element.

The outer diameter of the positioning bushing and/or the inner diameter of the sensor bushing recess is/are preferably specified here in such a way that an axial displacement of the positioning bushing in the sensor bushing recess is also possible. This enables the ultrasonic sensor to be brought into contact with the first end or with the coupling medium at the first end of the connection element to be measured.

In a further advantageous embodiment of the first aspect, the ultrasonic sensor is mechanically coupled to the positioning bushing by means of a fixing device. This enables a secure fixing of the ultrasonic sensor in the positioning bushing Alternative methods of fastening the ultrasonic sensor to the positioning bushing are also conceivable, for example gluing.

The invention is characterized, in accordance with a second aspect, by a method for taking a measurement at a connection element by means of the system according to the first aspect. In the method, the force sensor is provided and the sensor bushing is then mechanically coupled to the first side of the force sensor. The connection element is mechanically coupled via its first end to the sensor bushing and via its second end to the second side of the force sensor. The positioning bushing is introduced with the ultrasonic sensor into the sensor bushing recess until the ultrasonic sensor is in contact with the first end of the connection element. By means of the ultrasonic sensor, a measured value is recorded, the value being representative for a stress-free state of the connection element.

In this arrangement, a measured value of the force sensor is not necessary. However, the orientation of the ultrasonic sensor by means of the positioning bushing in the sensor bushing recess is utilized here in order to achieve a sufficient reflection of the fed ultrasonic signal at the reflecting end of the connection element.

The invention is characterized, in accordance with a third aspect, by a method for taking a measurement at a connection element by means of the system according to the first aspect. In the method, the force sensor is provided and the sensor bushing is then mechanically coupled to the first side of the force sensor. The connection element is mechanically coupled via its first end to the sensor bushing and via its second end to the second side of the force sensor. The connection element is then secured, such that a force acts between the first and second side of the force sensor. The positioning bushing is introduced with the ultrasonic sensor into the sensor bushing recess until the ultrasonic sensor is in contact with the first end of the connection element. By means of the ultrasonic sensor, a specified measurement signal is fed into the connection element and, depending on this, a measured value is recorded. A measured force value is recorded by means of the force sensor. Depending on the measured value and the measured force value, a conversion factor is ascertained. Depending on this conversion factor, a preload of the connection element in the installed state can be ascertained.

The measurement signal is preferably formed as a specified ultrasonic signal. The measured value is preferably representative for a propagation time of the ultrasonic signal in the connection element. The recorded measured force value is representative for the force acting between the first and second side of the force sensor. The positioning bushing is preferably introduced with the ultrasonic sensor into the sensor bushing recess until the ultrasonic sensor is in contact with the first end of the connection element by means of a coupling medium.

In one embodiment of the method according to the second and third aspect, in a first run-through of the method, the connection element can be measured in the stress-free state. A zero state value is preferably recorded from this measurement. In following run-throughs, the connection element is then measured according to the third aspect. Measured values and the assigned measured force values are recorded from these subsequent run-throughs, and, depending thereon, a conversion factor can then be ascertained in turn. A difference between the zero state value and the relevant measured value is preferably ascertained, and this difference correlated to the measured force value. Depending on this, the conversion factor is ascertained for the embodiment of the connection element type just measured. If, for example, a connection element is measured in an installed state, this connection element is preferably acted on by a preload. If, for example, a measured value is recorded by means of the ultrasonic sensor, for example a propagation time of the measurement signal in the connection element, a value can be ascertained depending on this and depending on the conversion factor assigned to the connection element, the value being representative for the preload of the connection element.

BRIEF DESCRIPTION OF THE DRAWINGS

The above-described aspects and further aspects, features and advantages of the invention can also be deduced from the examples of the embodiments, which will be described hereinafter with reference to the accompanying drawings.

DETAILED DESCRIPTION OF THE PREFERRED EMBODIMENTS

In the figures, like reference signs are used for like or at least similar elements, components or aspects. It is noted that embodiments that are merely illustrative and that are not limiting are described in detail hereinafter.

Figure 1:
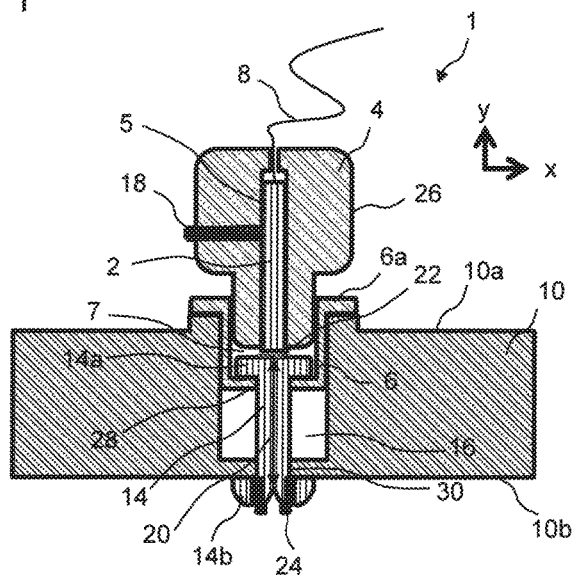
FIG. 1 shows a system for taking a measurement.

In FIG. 1, a measuring system, also referred to hereinafter as the system 1, is illustrated in a longitudinal section. The system 1 comprises a force sensor 10, for example a load cell, having a first side 10a and a second side 10b. The force sensor 10 is designed to output a measured value representative for a force acting between the first side 10a and the second side 10b.

The system 1 also comprises an ultrasonic sensor 2 and a positioning bushing 4. The positioning bushing 4 has a positioning bushing recess 5. A diameter of the positioning bushing recess 5 is substantially identical to an outer diameter of the ultrasonic sensor 2. The positioning bushing 4 is thus designed to receive the ultrasonic sensor 2. However, the positioning bushing recess 5 is at least designed to receive the ultrasonic sensor 2 in the region of its sensor head.

The ultrasonic sensor 2 is typically electrically coupled by means of a cable 8 to an evaluation unit (not illustrated).

The system 1 additionally comprises a sensor bushing 6 having a sensor bushing recess 7. An outer diameter of the positioning bushing 4 in the region of the sensor head of the ultrasonic sensor 2 is substantially identical to an inner diameter of the sensor bushing recess 7. The positioning bushing 4 can thus be guided with the ultrasonic sensor 2 into the sensor bushing recess 7. Here, the outer diameter of the positioning bushing 4 and/or the inner diameter of the sensor bushing recess 7 is/are specified in such a way that an axial displacement of the positioning bushing 4 in the y-direction is possible.

A connection element 14 is also arranged, at least in part, in the sensor bushing recess 7. The connection element 14 is formed, for example, as a screw rivet.

The force sensor 10 preferably has a recess 16. The sensor bushing 10 is preferably hollow-cylindrical and has a flange 6a. The sensor bushing 10 can be introduced into the recess 16 in the force sensor 10 until the flange is in contact with the first side 10a of the force sensor 10. By means of the flange 6a, the sensor bushing 6 is mechanically coupled to the first side 10a of the force sensor 10 and can thus act on this first side 10a of the force sensor 10. Alternatively, however, other mechanical coupling methods known to a person skilled in the art can be used.

The connection element 14 is preferably arranged with a first end 14a in the sensor bushing recess 7. The sensor bushing 6 can have an opening 28 adjoining the sensor bushing recess 7, the diameter of the opening corresponding to a shaft diameter of the connection element 14. If the connection element 14 has a head region, of which the diameter is greater than the shaft diameter, the connection element 14 can be guided through the opening, until the head region prevents a further guidance. The first end 14a of the connection element 14 is thus mechanically coupled to the sensor bushing 6 and acts on the first side 10a of the force sensor 10 by means of the sensor bushing 6.

A second end 14b of the connection element 14 is mechanically coupled to the second end 10b of the force sensor 10. For this purpose, the force sensor 10 can have a sensor opening 30, through which the shaft of the connection element 14, in the region of its second end 14b, is guided. By means of a fixing of the second end 14b of the connection element 14, for example by a nut that has been screwed on, the second end 14b is mechanically coupled to the second end 10b of the force sensor 10.

The first end 14a of the connection element 14 thus acts by means of the sensor bushing 6 on the first side 10a of the force sensor 10, and the second end 14b of the connection element 14 act on the second side 10b of the force sensor 10. If the connection element 14 is fastened or fixed in this arrangement, this results in a force acting between the first and second side 10a, 10b of the force sensor 10.

If the connection element 14 is fastened in the system 1 for measurement, the positioning bushing 4 can be arranged with the ultrasonic sensor 2 in the sensor bushing recess 7 and can be brought into contact with the first end 14a of the connection element 14.

By way of example, within the scope of what is known as a pulse-echo process, a specified ultrasonic signal 20 is fed into the connection element 14 by means of the ultrasonic sensor 2. The specified ultrasonic signal 20 is reflected in the connection element 14 at the second end 14b of the connection element 14 in a reflection region 24. Here, the reflection region 24 of the second end 14b can be flat or can have one or more known irregularities. The orientation of the ultrasonic sensor 2 relative to the connection element 14 is specified by means of the positioning bushing recess 5 and/or the sensor bushing recess 7 in such a way that the ultrasonic signal 20 is reliably reflected in the direction of the sensor head, even if there are irregularities, such as one or more recesses.

The ultrasonic sensor 2 is preferably also designed to detect the reflected ultrasonic signal 20. On the basis of a difference of the time of feed and time of receipt of the corresponding ultrasonic signal 20, the propagation time of the signal in the connection element 14 and, depending thereon, a length of the connection element 14 can be ascertained. The propagation time is preferably ascertained by the evaluation unit electrically coupled to the ultrasonic sensor 2. By means of the force sensor 10, a measured force value is recorded and made available, the measured force value being representative for the force acting between the first and second side 10a, 10b of the force sensor 10. Depending on the recorded propagation time and the force value, a conversion factor can be ascertained for the embodiment of the connection element just measured. Prior to a measurement, a zero state value is preferably also ascertained, which is representative for a propagation time of the ultrasonic signal in the stress-free connection element. The conversion factor is then ascertained depending on the difference of the zero state value, the propagation time in the stressed connection element, and the force value. Here, a plurality of connection elements of one embodiment of the connection element type can be measured in order to ascertain the conversion factor.

The positioning bushing 4 is preferably produced from a plastic. Alternatively, or additionally, the positioning bushing can comprise metal. The positioning bushing 4 can also have a grip region 26, which, for example, has a specified fluting, in order to enable particularly reliable manual handling.

The positioning bushing 4 preferably has a fixing device 18, by means of which the ultrasonic sensor 2 is mechanically coupled to the positioning bushing 4. The fixing device 18 is embodied, for example, as one or more screws, which each bite into a thread, the threads being formed in the positioning bushing 4. Here, the screw in question is screwed into the assigned thread in such a way that the screw is coupled in a frictionally engaged manner to the ultrasonic sensor 2. Alternatively, the fixing device can also be formed as a snap-fit device or as another mechanism known to a person skilled in the art, in order to mechanically couple the ultrasonic sensor 2 to the positioning bushing 4. Alternatively, the ultrasonic sensor 2 can also be glued in the positioning bushing 4.

Figure 2:
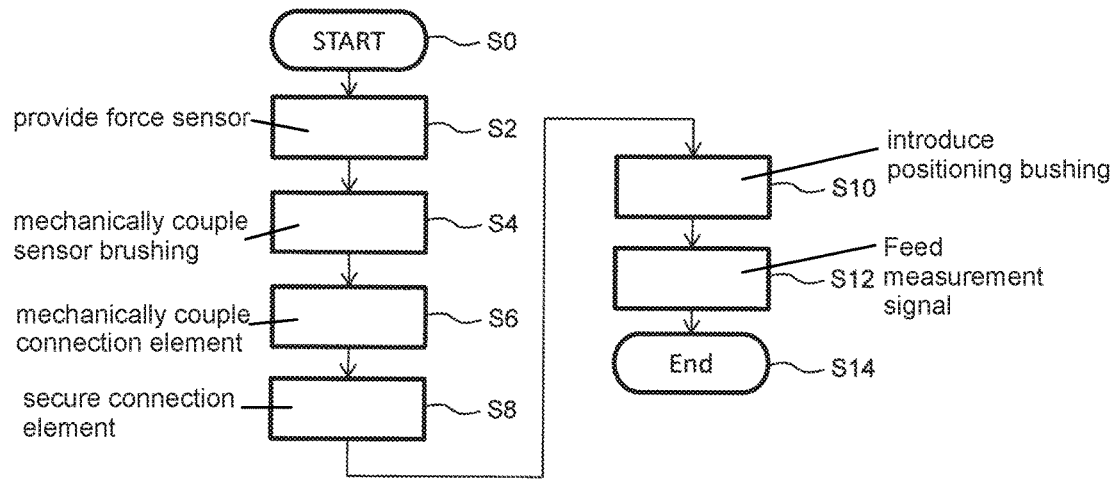
FIG. 2 shows a method for taking a measurement.

In FIG. 2 a method sequence for taking a measurement at a connection element 14 is illustrated. The method is started in a step SO.

In a further step S2, the force sensor 10 is provided.

In a step S4, the sensor bushing 10 is mechanically coupled to the first side 10a of the force sensor 10.

In a further step S6, the connection element 14 is mechanically coupled via its first end 14a to the sensor bushing 6. The connection element 14 is mechanically coupled via its second end 14b to the second side 10b of the force sensor 10.

In a step S8, the connection element 14 is secured. Securing means that, for example, the second end 14b of the connection element 14 is secured in such a way that a force acts between the first and second side 10a, 10b of the force sensor 10. In order to ascertain the zero state value, the step S8 is bypassed, i.e., there is no force acting between the first and second side 10a, 10b of the force sensor 10.

In a step S10, the positioning bushing 4 is introduced with the ultrasonic sensor 2 into the sensor bushing recess 7 until the ultrasonic sensor 2 is in contact with the first end 14a of the connection element 14. Alternatively, the contact between the ultrasonic sensor 2 and the first end 14a of the connection element 14 can also be produced by means of a coupling medium, for example a gel material, oil or water.

In a step S 12, a measurement signal 20, for example an ultrasonic signal, is fed into the connection element by means of the ultrasonic sensor 14 and, depending thereon, a measured value is recorded, which is representative for a propagation time of the measurement signal 20 in the connection element. A measured force value is also recorded by means of the force sensor 10 and is made available. The measured force value is representative for a force between the first and second side 10a, 10b of the force sensor 10. In order to ascertain the zero state value, the force between the first and second side 10a, 10b corresponds to a zero value.

In a step S14, the method is completed. For further measurements of connection elements 14, the method is started again with step S0.

By means of a number of measured values each ascertained in accordance with the method according to FIG. 2, a conversion factor can be ascertained for the embodiment of the particular connection element just measured. The ascertained conversion factor enables a conversion from the measured propagation time into the length or preload. If different embodiments and/or different connection element types are measured in this way, a corresponding conversion factor can be ascertained for each embodiment and/or for each connection element type.

Whereas the invention has been illustrated and described in detail in the drawings and the above description, such illustrations and descriptions are intended to be merely illustrative or exemplary, and are not intended to be restrictive, such that the invention is not limited by the disclosed embodiments. In the claims, the word "comprising" does not rule out other elements, and the indefinite article "a" does not rule out a plurality. The fact that certain features are specified in different dependent claims does not limit the subject matter of the invention. Combinations of these features can also be used advantageously.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE SIGNS 1 system
2 ultrasonic sensor
4 positioning bushing
5 positioning bushing recess
6 sensor bushing
7 sensor bushing recess
8 cable
10 force sensor
10a, b sides of the force sensor
14 connection element
14a, b ends of the connection element
16 force sensor recess
20 measurement signal
22 coupling medium
24 reflection region
26 grip region
28 opening
30 sensor opening
S0-S14 method steps

The invention claimed is:

1. A system for taking a measurement at a connection element, said system comprising:
a force sensor having a first side and a second side, the force sensor being configured to provide a measured value representative for a force acting between the first and the second side of the force sensor,
an ultrasonic sensor,
a positioning bushing, which has a positioning bushing recess, the positioning bushing recess being configured to receive the ultrasonic sensor at least in part, and
a sensor bushing, which is mechanically coupled to the first side of the force sensor and which has a sensor bushing recess, which is configured to receive, at least in part, the positioning bushing and the first end of the connection element, a second end of the connection element being mechanically coupled to the second side of the force sensor.

2. The system according to claim 1, in which an outer diameter of the positioning bushing in the region of a sensor head of the ultrasonic sensor is substantially identical to an inner diameter of the sensor bushing recess of the sensor bushing.

3. The system according to claim 1, in which the positioning bushing recess is arranged in the positioning bushing in such a way that, during a measurement of the connection element, the ultrasonic sensor is in contact with a specified end of the connection element within the sensor bushing recess.

4. The system according to claim 1, in which the ultrasonic sensor is mechanically coupled to the positioning bushing by a fixing device.

5. A method for taking a measurement at a connection element by means of the system according to claim 1, comprising the steps:
providing the force sensor,
mechanically coupling the sensor bushing to the first side of the force sensor,
mechanically coupling the connection element via its first end to the sensor bushing and via its second end to the second side of the force sensor, introducing the positioning bushing with the ultrasonic sensor into the sensor bushing recess until the ultrasonic sensor is in contact with the first end of the connection element, and recording a measured value by means of the ultrasonic sensor, said value being representative for a stress-free state of the connection element.

6. The method for taking a measurement at a connection element by means of the system according to claim 1, comprising the steps:

providing the force sensor, mechanically coupling the sensor bushing to the first side of the force sensor, mechanically coupling the connection element via its first end to the sensor bushing and via its second end to the second side of the force sensor, securing the connection element, such that a force acts between the first and second side of the force sensor, introducing the positioning bushing with the ultrasonic sensor into the sensor bushing recess until the ultrasonic sensor is in contact with the first end of the connection element, feeding a specified measurement signal into the connection element by means of the ultrasonic sensor and, depending on this, recording a measured value, recording a measured force value by means of the force sensor, and depending on the measured value and the measured force value, ascertaining a conversion factor, depending on which a preload of the connection element can be ascertained.

* * * * *